(12) United States Patent
Ueda et al.

(10) Patent No.: US 9,374,572 B2
(45) Date of Patent: Jun. 21, 2016

(54) IMAGE PICKUP APPARATUS, IMAGE PICKUP SYSTEM, METHOD OF CONTROLLING IMAGE PICKUP APPARATUS, AND NON-TRANSITORY COMPUTER-READABLE STORAGE MEDIUM

(71) Applicant: CANON KABUSHIKI KAISHA, Tokyo (JP)

(72) Inventors: Toshiharu Ueda, Machida (JP); Takafumi Kishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 210 days.

(21) Appl. No.: 13/957,842

(22) Filed: Aug. 2, 2013

(65) Prior Publication Data

US 2014/0043437 A1 Feb. 13, 2014

(30) Foreign Application Priority Data

Aug. 9, 2012 (JP) .................................. 2012-176657

(51) Int. Cl.
*H04N 13/02* (2006.01)
*H04N 13/00* (2006.01)

(52) U.S. Cl.
CPC ....... *H04N 13/0296* (2013.01); *H04N 13/0232* (2013.01); *H04N 13/0246* (2013.01); *H04N 13/0217* (2013.01); *H04N 2013/0081* (2013.01)

(58) Field of Classification Search
CPC .......... H04N 13/0239; H04N 13/0055; H04N 13/0296; H04N 13/0497; H04N 13/0242
See application file for complete search history.

(56) References Cited

U.S. PATENT DOCUMENTS

| | | | |
|---|---|---|---|
| 2009/0002505 A1* | 1/2009 | Imada | H04N 9/093 348/218.1 |
| 2010/0045844 A1* | 2/2010 | Yamamoto | H04N 5/2254 348/340 |

(Continued)

FOREIGN PATENT DOCUMENTS

| | | |
|---|---|---|
| EP | 2157801 A2 | 2/2010 |
| EP | 2244484 A1 | 10/2010 |

(Continued)

OTHER PUBLICATIONS

European Search Report issued on Apr. 1, 2015, in the corresponding European Patent Application No. 13178988.5.

(Continued)

*Primary Examiner* — Sath V Perungavoor
*Assistant Examiner* — Howard D Brown, Jr.
(74) *Attorney, Agent, or Firm* — Cowan, Liebowitz & Latman, P.C.

(57) ABSTRACT

An image pickup apparatus (100) that generates a three-dimensional image, includes an image pickup element (114) including a micro lens (2) and a pixel unit cell (1) including a plurality of pixels (1a, 1b) arranged to receive light from the microlens (2), wherein the image pickup element is configured to output separated first image and second image signals for respective pixels of the pixel unit cell, a parallax detector (123) configured to calculate a parallax comprising an image shift amount between the first image signal and the second image signal, and an image correcting portion (120) configured to perform a correction to change the parallax, wherein the amount of change of the parallax depends on a change of the aperture stop (111).

9 Claims, 10 Drawing Sheets

(56) References Cited

U.S. PATENT DOCUMENTS

| | | | |
|---|---|---|---|
| 2010/0053354 A1* | 3/2010 | Hayasaka | H04N 5/2254 348/222.1 |
| 2011/0012991 A1* | 1/2011 | Watanabe | H04N 13/80055 348/43 |
| 2011/0058097 A1* | 3/2011 | Mizuo | G03B 13/20 348/350 |
| 2011/0199458 A1* | 8/2011 | Hayasaka | G06T 7/0075 348/43 |
| 2011/0279643 A1* | 11/2011 | Inamura | H04N 13/0025 348/43 |
| 2012/0147150 A1* | 6/2012 | Kojima | G01C 3/085 348/50 |

FOREIGN PATENT DOCUMENTS

| | | | |
|---|---|---|---|
| EP | 2369392 A1 | 9/2011 | |
| EP | 2475162 A2 | 7/2012 | |
| JP | 4027113 B2 | 10/2007 | |
| JP | EP2157801 A2 * | 7/2009 | H04N 9/04 |
| JP | 2010-068018 A | 3/2010 | |
| JP | 2010-068182 A | 3/2010 | |
| WO | 2012/002307 A1 | 1/2012 | |
| WO | 2012/081684 A1 | 6/2012 | |

OTHER PUBLICATIONS

Mar. 1, 2016 Japanese Office Action that issued in Japanese Patent Application No. 2012-176657.

* cited by examiner

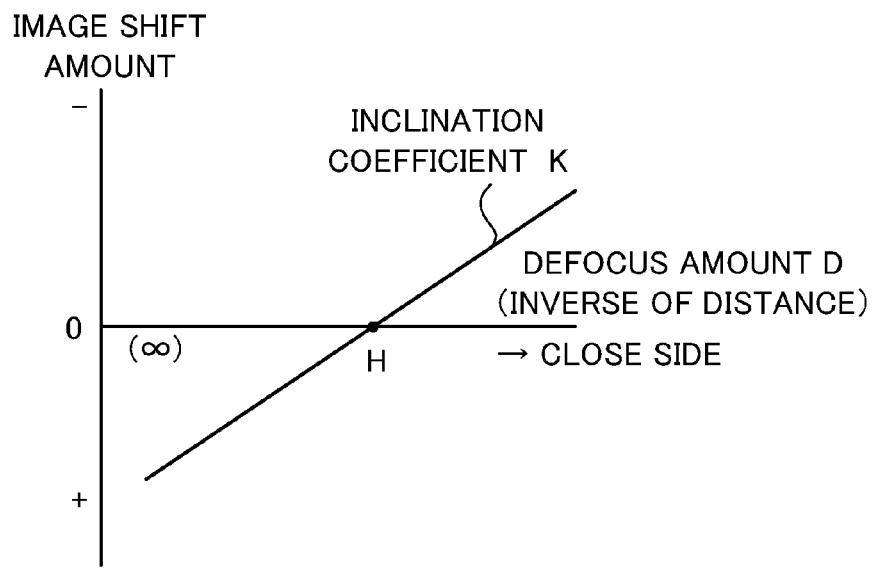
FIG. 7
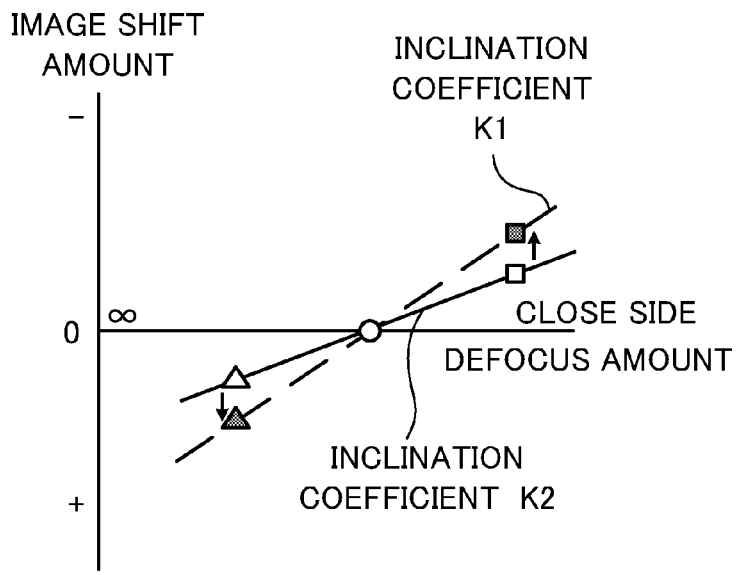
FIG. 8
| FOCAL LENGTH (mm) | DIAMETER OF APERTURE STOP (F-NUMBER) | | | | | | | |
|---|---|---|---|---|---|---|---|---|
| | 1.8 | 2.8 | 4 | 5.6 | 8 | 11 | 16 | 22 |
| 50 | 1.80 | 1.56 | 1.05 | 0.70 | 0.39 | 0.26 | 0.23 | 0.04 |
FIG. 9

POSITION RELATION OF OBJECTS
(TOP VIEW)
OBJECT AT FAR DISTANCE
MAIN OBJECT= IN-FOCUS POSITION
IMAGE PICKUP APPARATUS

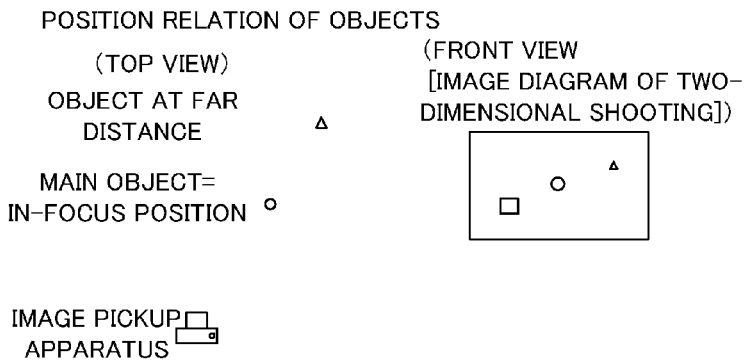

FIG. 10A    FIG. 10B

OUTPUT OF SHOT IMAGE IN REFERENCE DIAMETER d1 OF APERTURE STOP (UNCORRECTED)

OUTPUT OF SHOT IMAGE AT THE TIME OF SHOOTING (DIAMETER OF APERTURE STOP: d2, UNCORRECTED)

OUTPUT OF SHOT IMAGE AT THE TIME OF SHOOTING (DIAMETER OF APERTURE STOP: d2, CORRECTED)

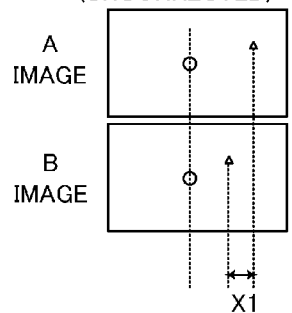 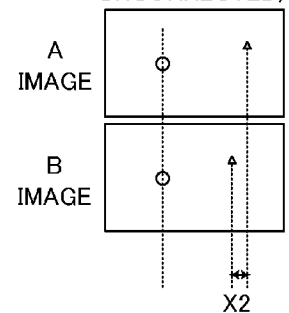 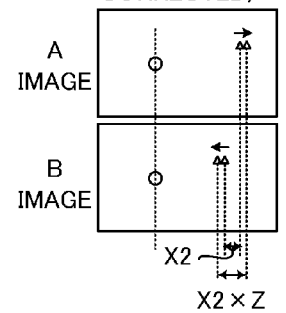

FIG. 10C    FIG. 10D    FIG. 10E

THREE-DIMENSIONAL EFFECT OF DISPLAY IN REFERENCE DIAMETER d1 OF APERTURE STOP

THREE-DIMENSIONAL EFFECT OF DISPLAY IN DIAMETER d2 OF APERTURE STOP (UNCORRECTED)

THREE-DIMENSIONAL EFFECT OF DISPLAY IN DIAMETER d2 OF APERTURE STOP (CORRECTED)

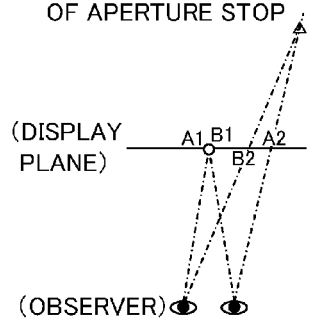 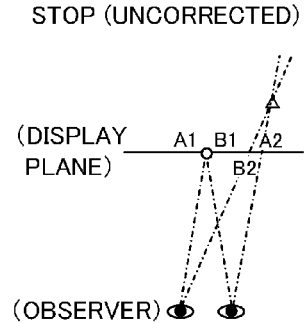 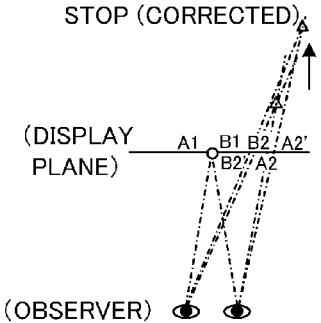

FIG. 10F    FIG. 10G    FIG. 10H

IMAGE PICKUP APPARATUS, IMAGE PICKUP SYSTEM, METHOD OF CONTROLLING IMAGE PICKUP APPARATUS, AND NON-TRANSITORY COMPUTER-READABLE STORAGE MEDIUM

BACKGROUND OF THE INVENTION

1. Field of the Invention

The present invention relates to an image pickup apparatus that generates a three-dimensional image.

2. Description of the Related Art

Recently, an image pickup element that includes a pixel unit cell configured by arranging a plurality of pixels for one microlens (a composite pixel structure) and that outputs a first image signal and a second image signal separated for each pixel of the pixel unit cell is proposed.

Japanese Patent No. 4027113 discloses a configuration in which a part of an image pickup element has a composite pixel structure and this composite pixel is used as a pixel for obtaining information (ranging). However, considering the performance of obtaining the information (ranging performance), it is effective that an entire region of the image pickup element is the composite pixel structure. Therefore, it is proposed that the composite pixel structure is adopted for an entire surface of the image pickup element and that a pixel unit in the composite pixel structure is used for both shooting an image and obtaining the information (for the ranging).

Furthermore, recently, two images (a left-sided image and a right-sided image) having a parallax can be obtained using the pixel having the composite pixel structure. Therefore, achieving a monocular three-dimensional image pickup apparatus in which it is not necessary to use binocular image pickup apparatus (a plurality of image pickup apparatuses) is considered.

When the binocular image pickup apparatus (the plurality of image pickup apparatuses) are used, a three-dimensional effect is determined by a congestion angle of two image pickup apparatuses (cameras), and therefore a stable three-dimensional effect can be obtained even when an aperture stop of an image pickup optical system is changed.

However, when the three-dimensional image is obtained by using the monocular image pickup apparatus, an image shift amount generated on an imaging plane changes in accordance with the aperture stop (a diameter of the aperture stop) of the image pickup optical system. In other words, even when an identical object is shot, the image shift amount is changed by changing the aperture stop and therefore the three-dimensional effect is changed.

BRIEF SUMMARY OF THE INVENTION

The present invention provides an image pickup apparatus, an image pickup system, and a method of controlling the image pickup apparatus that reduce a dependency of a three-dimensional effect on an aperture stop when a three-dimensional image is generated using an image pickup element that includes a pixel unit cell configured by arranging a plurality of pixels for one microlens. In addition, the present invention provides a non-transitory computer-readable storage medium that stores a computer-executable program.

An image pickup apparatus as one aspect of the present invention generates a three-dimensional image, and includes an image pickup element comprising a microlens and a pixel unit cell comprising a plurality of pixels configured to receive light from the microlens, the image pickup element being configured to output a separated first image signal and second image signal for respective pixels of the pixel unit cell, a parallax detector configured to calculate a parallax comprising an image shift amount between the first image signal and the second image signal, and an image correcting portion configured to perform a correction to change the parallax, wherein the amount of change of the parallax depends on a change in the aperture stop.

An image pickup system as another aspect of the present invention includes the image pickup apparatus and an image pickup optical system configured to form an optical image on the image pickup element.

A method of controlling an image pickup apparatus as another aspect of the present invention is a method of controlling an image pickup apparatus that generates a three-dimensional image, and includes the steps of outputting a separate first image signal and second image signal for respective pixels of a pixel unit cell of an image pickup apparatus, calculating a parallax comprising an image shift amount between the first image signal and the second image signal, and performing a correction to change the parallax, wherein the amount of change of the parallax depends on a change of the aperture stop.

A non-transitory computer-readable storage medium as another aspect of the present invention is a non-transitory computer-readable storage medium that stores a program that upon execution causes a computer to perform the method of controlling the image pickup apparatus.

Further features and aspects of the present invention will become apparent from the following description of exemplary embodiments with reference to the attached drawings.

BRIEF DESCRIPTION OF THE DRAWINGS

FIG. 7 is a diagram of a relationship between a defocus amount and an image shift amount in Embodiment 1.

FIG. 8 is a diagram of a relationship between the defocus amount and the image shift amount (dependency on the aperture stop) in Embodiment 1.

FIG. 9 is a diagram of a relationship between a diameter of the aperture stop (an F-number) and an inclination coefficient in Embodiment 1.

FIGS. 10A to 10H are schematic diagrams of correcting a three-dimensional effect in Embodiment 1.

DETAILED DESCRIPTION OF THE PREFERRED EMBODIMENTS

Exemplary embodiments of the present invention will be described below with reference to the accompanied drawings.

Embodiment 1

Figure 1:
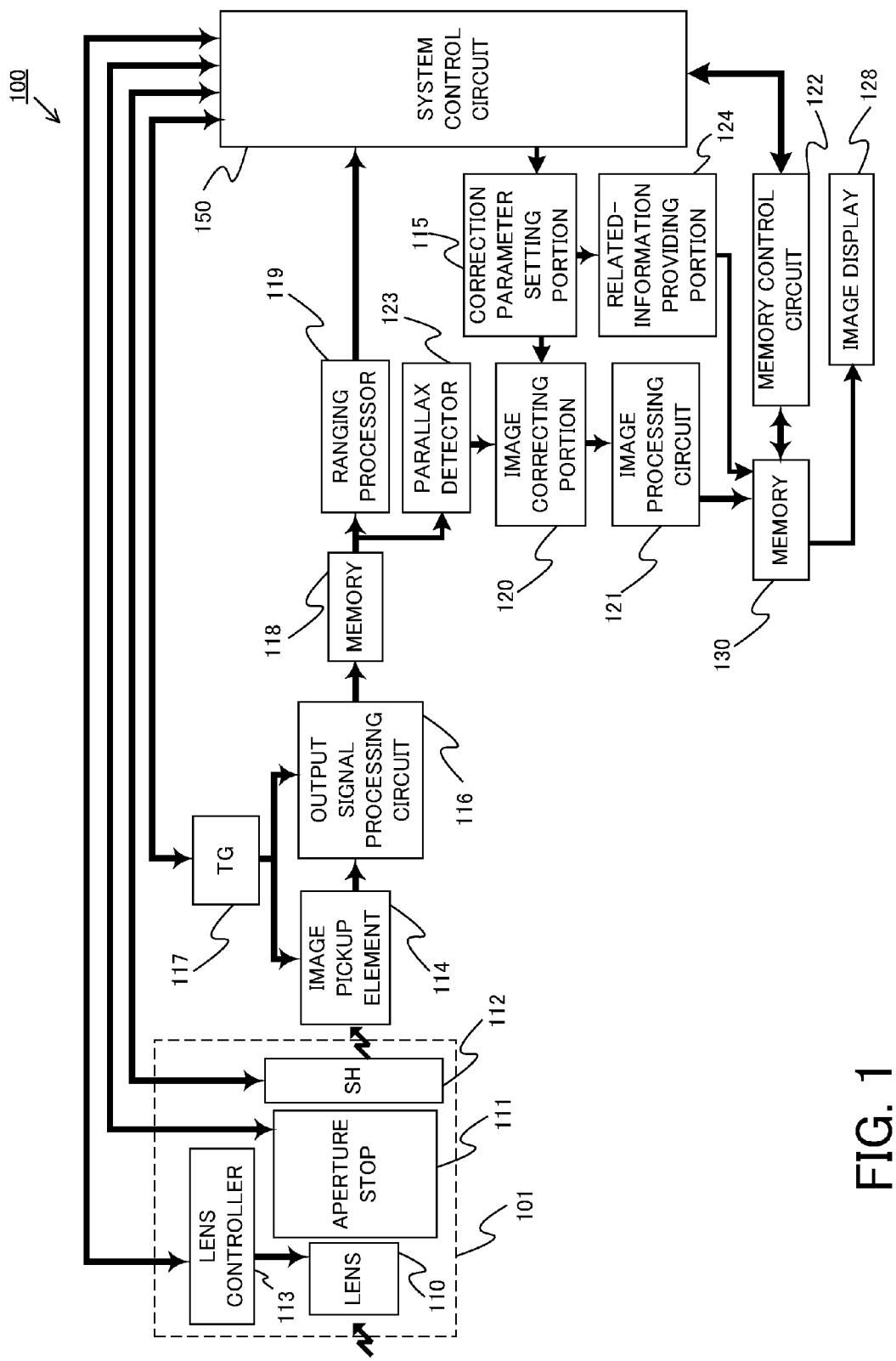
FIG. 1 is a block diagram of illustrating an overall configuration of an image pickup apparatus in Embodiment 1.

First of all, referring to FIG. 1, an image pickup apparatus in Embodiment 1 of the present invention will be described. FIG. 1 is a block diagram of illustrating an overall configuration of an image pickup apparatus 100 (an image pickup system). The image pickup apparatus 100 is an image pickup apparatus that generates a three-dimensional image. Reference numeral 110 denotes a lens (an image pickup lens) that forms an optical image (an object image) on an image pickup element 114. Reference numeral 111 denotes an aperture stop that limits light entering the image pickup element 114 via the lens 110. Reference numeral 112 denotes a shutter (SH) that blocks incident light on the image pickup element 114 via the lens 110. Reference numeral 113 denotes a lens controller that performs a focus control of the lens 110, an opening diameter control of the aperture stop 111, and the like. A lens unit 101 (an image pickup optical system) is configured by the lens 110, the aperture stop 111, the shutter 112, and the lens controller 113. The image pickup apparatus 100 is configured by the lens unit 101 and an image pickup apparatus body.

Reference numeral 114 denotes an image pickup element such as a CMOS sensor or a CCD sensor that converts the optical image obtained via the lens unit 101 into an electric signal (an analog signal). The image pickup element 114 includes a pixel unit cell configured by arranging a plurality of pixels for one microlens, and outputs separated image signals for each pixel of the pixel unit cell (a first image signal and a second image signal). In such a configuration, a different image signal for each pixel unit cell can be outputted. Details of the structure of the image pickup element 114 will be described below with reference to FIGS. 2 and 3.

Reference numeral 116 denotes an output signal processing circuit. The output signal processing circuit 116 performs a processing of an OB (optical black) clamp to adjust a level of an optical black to a standard level for the analog signal outputted from the image pickup element 114 or the like. The output signal processing circuit 116 includes an analog front end (AFE) that converts this analog signal into a digital signal, a digital front end (DFE) that performs various kinds of correction processing or a digital processing such as reordering by receiving a digital output of each pixel, and the like.

Reference numeral 117 denotes a timing generating circuit (TG) that supplies a control signal to the image pickup element 114 and the output signal processing circuit 116. Reference numeral 118 denotes a memory that temporarily stores an output of the output signal processing circuit 116 in order to perform a ranging calculation (focus detecting calculation) and an image processing at subsequent stages. Reference numeral 119 denotes a ranging processor that performs a ranging calculation using left-sided and right-sided image signals (image outputs) of the image pickup element 114 stored in the memory 118, i.e. signals digitally processed by the output signal processing circuit 116. The ranging processor 119 performs a correlation calculation in an output direction where the images are separated with respect to the image pickup element 114 so as to obtain a defocus amount of the lens 110, and transfers information related to the defocus amount to a system control circuit 150 described below.

Reference numeral 123 denotes a parallax detector that performs a correlation calculation for the right-sided and left-sided image signals of the image pickup element 114 stored in the memory 118 so as to calculate an image shift amount at corresponding points (matching points) of the right-sided and left-sided images. The parallax detector 123 makes a well-known parallax map based on the image shift amount between the right-sided and left-sided images at each point (at each corresponding point) so as to obtain the image shift amount of the right-sided and left-sided images. In the present embodiment, the "image shift amount of the right-sided and left-sided images" or the "image shift amount of the corresponding points of the right-sided and left-sided images" is defined as a "parallax". Therefore, the parallax detector 123 calculates an image shift amount of a first image signal and a second image signal as a parallax. In other words, the parallax detector 123 is configured to calculate the parallax including the image shift amount between the first image signal and the second image signal. In the present embodiment, the parallax detector 123 is configured differently (separately) from the ranging processor 119, but the present embodiment is not limited to this. For example, the parallax detector 123 may also be provided inside the ranging processor 119 so as to make the parallax map in the middle of the ranging calculation.

Reference numeral 120 denotes an image correcting portion (a three-dimensional effect correcting portion). The image correcting portion 120 corrects an output of each pixel of an A image (the left-sided image) and a B image (the right-sided image) based on information of the parallax map made by the parallax detector 123 and lens information (a diameter of the aperture stop, a focal length, or the like) obtained at the time of shooting the image so as to correct the three-dimensional effect. In other words, the image correcting portion 120 is configured to perform a correction to change the parallax whose amount of change depends on a change of the aperture stop 111. Preferably, the image correcting portion 120 performs a correction so as to reduce an amount of change of the parallax depending on a change of the aperture stop 111 (the diameter of the aperture stop).

Reference numeral 115 denotes a correction parameter setting portion. The correction parameter setting portion 115 sets a parameter that is used to perform the correction by the image correcting portion 120. Reference numeral 121 denotes an image processing circuit. The image processing circuit 121 performs an image processing such as a predetermined color conversion for the image signal (data related to the image signal) digitally processed via the output signal processing circuit 116, the memory 118, the parallax detector 123, and the image correcting portion 120.

Reference numeral 124 denotes a related-information providing portion that generates each of related information of the right-sided and left-sided images in a saving format. The related-information providing portion 124 specifically generates related information containing information to correct the three-dimensional effect obtained by the image correcting portion 120 or the parallax detector 123. Reference numeral 122 denotes a memory control circuit. The memory control circuit 122 performs a control to transfer image data generated by the image processing circuit 121 and the related information generated by the related-information providing portion 124 to a memory 130 described below, or the like.

Reference numeral 128 denotes an image display including a TFT-type LCD. Reference numeral 130 denotes a memory that stores shot still image data or moving image data and the related information in connection with each other. Reference numeral 150 denotes a system control circuit that controls an entire of an image processing apparatus. The system control circuit 150 contains a well-known signal processing unit (a CPU) and the like. In a common image pickup apparatus, a photometric portion, a power supply controller, a switch operating portion, and the like are also included, but they are not main elements in the present embodiment and therefore descriptions of the elements are omitted.

Figure 2:
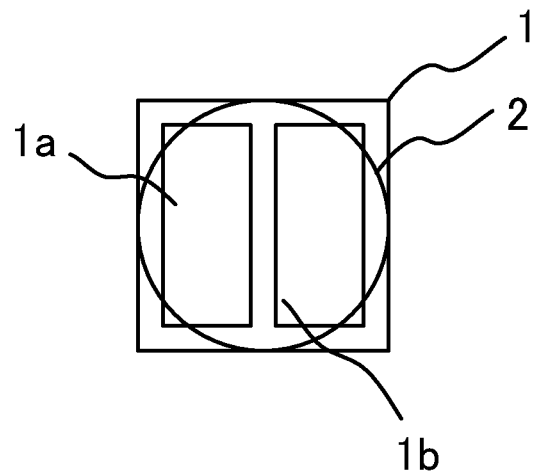
FIG. 2 is a conceptual diagram (a top view) of a pixel unit cell of an image pickup element in Embodiment 1.

Next, referring to FIG. 2, an image pickup element 114 of the present embodiment will be described. FIG. 2 is a conceptual diagram (a top view) of the pixel unit cell in the image pickup element 114 (an image pickup element having a composite pixel structure). Reference numeral 1 denotes a pixel unit cell of the image pickup element 114. Each of reference numerals 1a and 1b denotes a pixel that includes a structure of a well-known image pickup pixel containing a photoelectric conversion element. Each of signals (the first image signal and the second image signal) from the pixels 1a and 1b can be outputted independently of each other. A well-known color filter having an identical color is arranged on each of upper surfaces of the pixels 1a and 1b.

Reference numeral 2 denotes a microlens. The plurality of pixels 1a and 1b that are arranged under the one microlens 2 are treated as a pixel unit cell that obtains incident light via the identical microlens 2. The pixels 1a and 1b can obtain a plurality of different images that are obtained by pupil division according to their arrangements. Thus, the image pickup element 114 includes the micro lens 2 and the pixel unit cell 1 including the plurality of pixels 1a and 1b arranged to receive the light from the microlens 2, and the image pickup element 114 is configured to output separated first image and second image signals for respective pixels of the pixel unit cell 1. In the present embodiment, as the composite pixel structure, two separated pixels are provided inside the pixel unit cell 1, but the present embodiment is not limited to this. As the composite pixel structure, for example, a composite pixel configured by dividing the pixel unit cell into four, five, or nine pixels may also be adopted. In this case, an output of each of the divided pixels of the pixel unit cell 1 is added so as to obtain at least two image outputs (image signals) separated for the left eye and the right eye, and thus the similar effect can be obtained.

As a method of separating the image signal into the left-sided and right-sided images, for example, there is a method of adding two pixels at the upper left and the lower left and also adding two pixels at the upper right and the lower right when the pixel unit cell is configured by four pixels having two pixels vertically and horizontally. Alternatively, only a pair of two pixels separated to right and left (for example, two pixels at the upper right and the upper left) may be used to obtain outputs for the right and the left. When the pixel unit cell is configured by five pixels having two pixels vertically and horizontally and one pixel at the center, except the one pixel at the center, the outputs of the pixels separated to right and left can be obtained by adding the outputs similarly to the case of the configuration of the four pixels. Also in the case of the divided pixels of nine pixels where three pixels are arranged vertically and horizontally, the three vertical pixels at the left and the three vertical pixels at the right side are added and on the other hand the three vertical pixels at the center are excluded, and thus the outputs separated to the right and left images can be obtained similarly to the above case.

Figure 3:
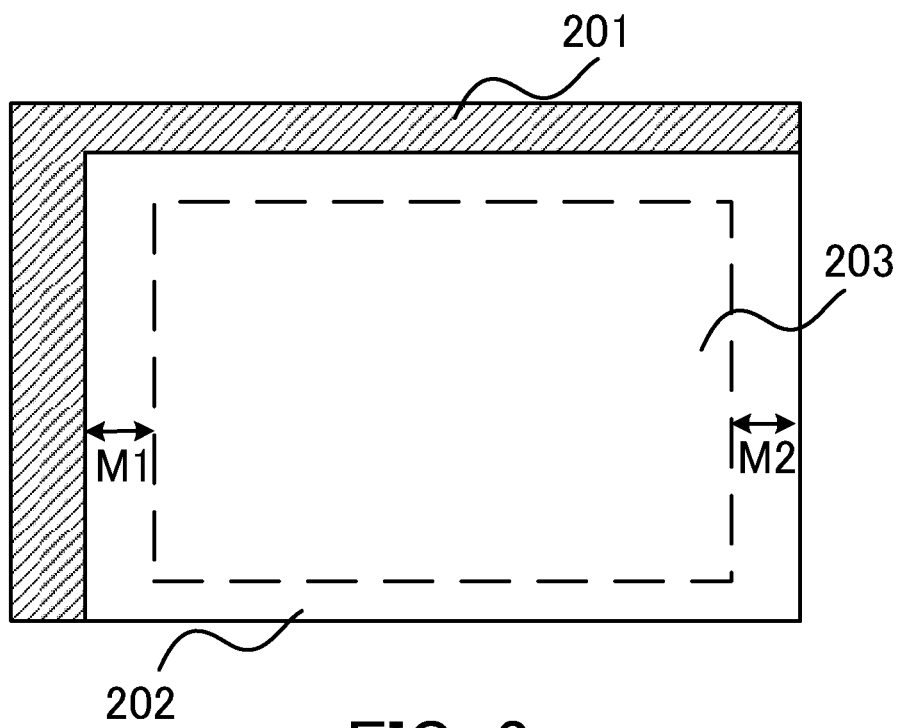
FIG. 3 is one example of a pixel arrangement of the image pickup element in Embodiment 1.

Next, referring to FIG. 3, a pixel arrangement of the image pickup element 114 will be described. FIG. 3 is a diagram of illustrating one example of the pixel arrangement of the image pickup element 114. Reference numeral 201 denotes an optical black (OB) pixel region that is a standard in the image processing. Reference numeral 202 denotes an effective pixel region in which the plurality of pixel unit cells 1 described with reference to FIG. 2 are arranged so as to obtain the image signals. Reference numeral 203 denotes a recording pixel region that is basically used as a recording pixel. The recording pixel region 203 is a basic recording pixel region in which a center of the effective pixel region 202 and a center of the recording pixel region 203 coincide with each other. The recording pixel region 203 is set so as to be narrower than the effective pixel region 202. A region (recording pixel margin regions M1 and M2) between an edge portion of the effective pixel region 202 and an edge portion of the recording pixel region 203 may be used when controlling the correction of the three-dimensional effect described below.

When image data are stored, it is preferred that data of the recording pixel region 203 are only stored so as to store image data for which the adjustment of the three-dimensional effect has been performed. However, generally, it is preferred that the recording pixel region 203 is stored in a multi-picture format (MPO) for which a post-processing is unnecessary, JPEG, a moving picture file such as an AVI file, or the like. When the recording pixel region 203 is stored, in addition to storing only the recording pixel region 203 for all the files, for example the effective pixel region 202 or all pixel regions may be stored when the file is stored in a RAW format. In this case, as related information, information related to the correction of the three-dimensional effect such as aperture stop information or focal length information of an image pickup optical system in adjusting the three-dimensional effect are given to be stored. Giving the related information will be described below with reference to FIG. 11 and the like.

Figure 4:
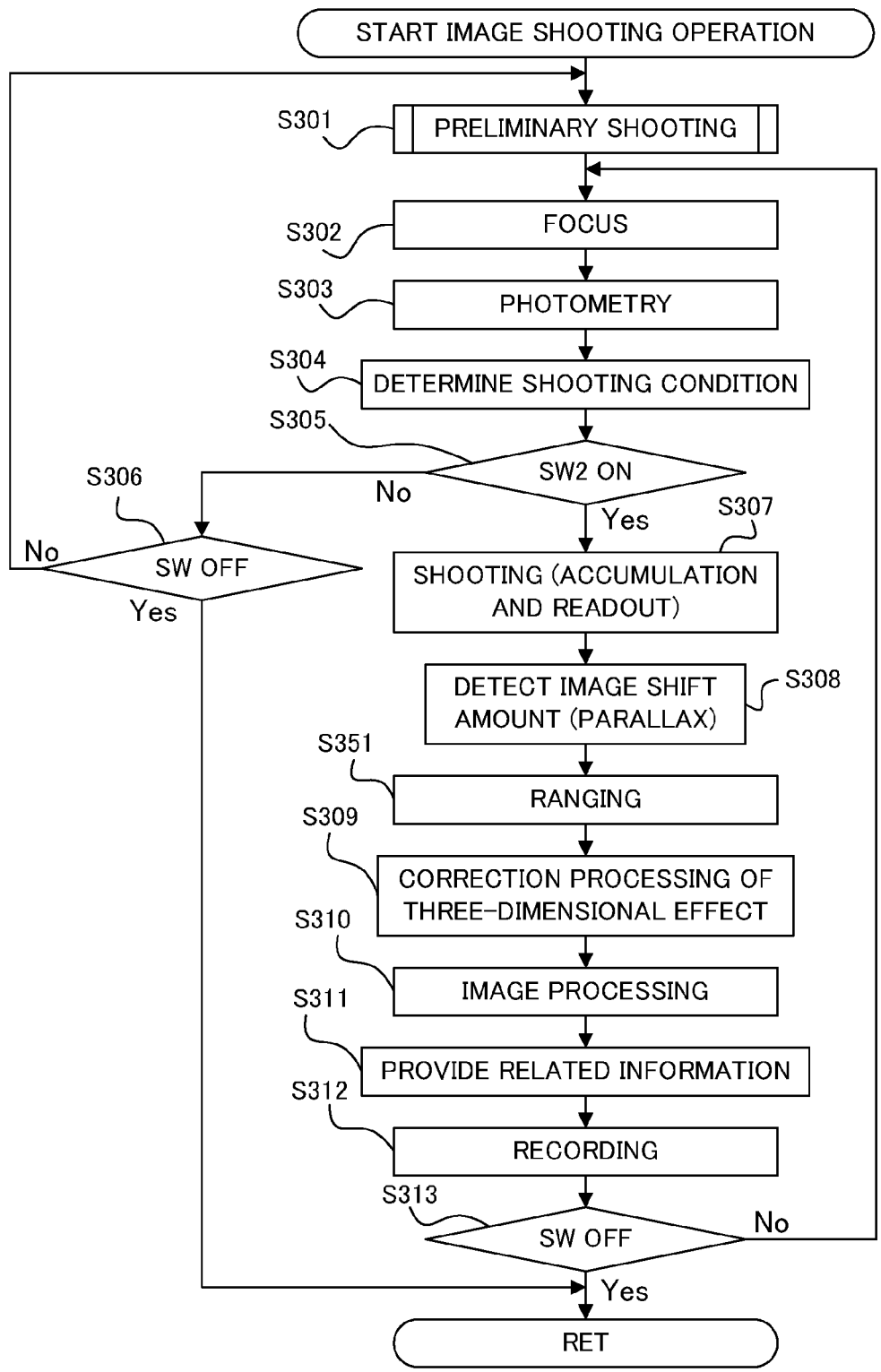
FIG. 4 is a flowchart of illustrating a shooting operation of the image pickup apparatus in Embodiment 1.

Next, referring to FIG. 4, the shooting operation of the image pickup apparatus 100 in the present embodiment will be described. FIG. 4 is a flowchart of illustrating the shooting operation of the image pickup apparatus 100. This flow starts when a shooting start switch SW such as a live-view start switch or a shooting preparation switch (not shown) is turned on. Each step of FIG. 4 is performed based on an instruction of the system control circuit 150.

First of all, in Step S301, a preliminary shooting that is required for a ranging operation and a photometric operation is performed before an actual shooting. The preliminary shooting is performed by the ranging processor 119 calculating a current focus position (defocus amount) based on the output signals (A image and B image) divided by the pixel unit cell 1 described with reference to FIG. 2. Subsequently, in Step S302, the system control circuit 150 obtains an in-focus position based on the defocus amount calculated in Step S301. The lens controller 113 performs a focus operation in which the lens 110 is driven to an in-focus target. Then, in Step S303, the photometric operation in which exposure information of an object are obtained is performed based on the information obtained in Step S301. Subsequently, in Step S304, a shooting condition such as an appropriate shutter speed at the time of the actual shooting is determined based on the exposure information of the object obtained in Step S303. The shooting condition (information related to the lens unit 101) determined in Step S304, specifically an aperture stop, a focal length, lens unique information, or the like is also stored in a memory (not shown).

Next, in Step S305, it is confirmed whether the shooting switch SW2 such as a still image recording switch or a moving image recording switch is turned on. When the shooting switch SW2 is turned on, the flow proceeds to Step S307. On the other hand, the shooting switch SW2 is not turned on, the flow proceeds to Step S306. In Step S306, it is confirmed whether the shooting start switch SW that is turned on at the time of starting the shooting is turned off. When the shooting start switch SW is turned off, the shooting operation is finished. On the other hand, when the shooting start switch SW remains in the on-state, the flow proceeds to Step S301 and the preliminary shooting is performed again.

In Step S307, in accordance with the shooting condition determined in Step S304, the shooting operation such as a shutter control, an accumulation or readout operation of the image pickup element 114 is performed. In some cases such as the moving image shooting, a time to mechanically block the light for each frame cannot be ensured. Therefore, the image pickup element 114 may be driven (a slit rolling shutter drive may be performed) so that the operation is performed while the shutter 112 is always open. The read output signal for each of the left-sided and right-sided images is temporarily stored in the memory 118.

Subsequently, in Step S308, the parallax detector 123 detects an image shift amount (a parallax) of corresponding points of the left-sided image (the A image) and the right-sided image (the B image) so as to make a parallax map. The detection of the parallax (the detection of the image shift amount) is performed based on an image that is read from the image pickup element 114 in Step S307 and that is temporarily stored in the memory 118 via the output signal processing circuit 116. The detection of the image shift amount in Step S308 will be described below with reference to FIGS. 5A and 5B.

Subsequently, in Step S351, the ranging processor 119 performs a correlation calculation of the image shot in Step S307 and the like so as to obtain the defocus amount, and this defocus amount is stored in a memory (not shown) as ranging data for the shooting of the next frame. In the present embodiment, since the ranging processor 119 and the parallax detector 123 are separately configured, Steps S308 and S351 are described as separated operations. However, since the detection result of the parallax detector 123 can also be used for the ranging operation, the parallax detection may be performed as a part of information of the ranging operation, and the detected parallax may also be used for the ranging information.

Next, in Step S309, the image correcting portion 120 obtains an appropriate correction amount for each of the pixel unit based on the parallax map made in Step S308 and the shooting condition (information related to the lens unit 101) stored in Step S304. Then, the image correcting portion 120 performs the processing of correcting the three-dimensional effect so as to compensate the shortfall of the parallax for the shot A image and B image based on this correction amount. Details of the processing of correcting the three-dimensional effect will be described below with reference to FIGS. 6A and 6B through 10A to 10H.

Subsequently, in Step S310, the image processing circuit 121 performs an image processing such as a color conversion for each of the A image and the B image obtained by the correction processing of the three-dimensional effect in Step S309. The image processing circuit 121 performs a development to JPEG or the like, a cutout of an image size, and a compression processing by this image processing, and stores the A image and the B image in a multi-picture format. In other words, according to this image processing, images obtained by correcting the three-dimensional effect of the A image and the B image (after adjusting the three-dimensional effect) are generated.

Subsequently, in Step S311, the related-information providing portion 124 reads image information containing information related to the correction processing of the three-dimensional effect and shooting related information from the correction parameter setting portion 115 or the like. Then, the related-information providing portion 124 generates related information and makes data formed by giving the related information to the image generated in Step S310.

Subsequently, in Step S312, the memory control circuit 122 transfers, to the memory 130, the data obtained by giving the related information generated in Step S311 to the image-processed data of Step S310, and then records the data in the memory 130. When the data are recorded in a RAW image, the image recording in Step S310 is performed in a state where the correction of the three-dimensional effect is not performed (in an unprocessed state), and parallax map information or image pickup lens related information are stored as the related information in Step S311. According to this configuration, they can also be treated as useful information when the correction of the three-dimensional effect is performed by the display unit after the image is stored. The present embodiment is not limited to the RAW image, and the related information may also be given when an image in the JPEG format is recorded.

Next, in Step S313, the system control circuit 150 determines whether the shooting start switch SW is turned off. When the shooting start switch SW is not turned off, the shooting is continued and the flow returns to Step S302. Then, the system control circuit 150 obtains an in-focus position based on the defocus amount calculated by the ranging processor 119 in last Step S351. Then, the lens controller 113 performs a focus operation in which the lens 110 is driven toward the in-focus target. On the other hand, in Step S313, when the shooting start switch SW is turned off, the shooting operation of this flow is finished, and the mode of the image pickup apparatus returns to be in a standby mode.

Figure 5A:
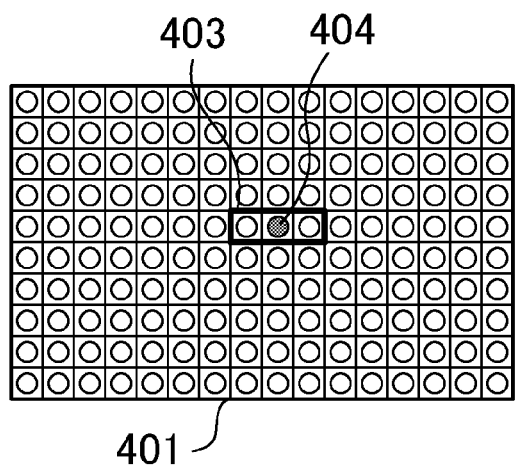
FIGS. 5A and 5B are diagrams of describing detection of an image shift amount (calculation of a parallax map) in Embodiment 1.
Figure 5B:
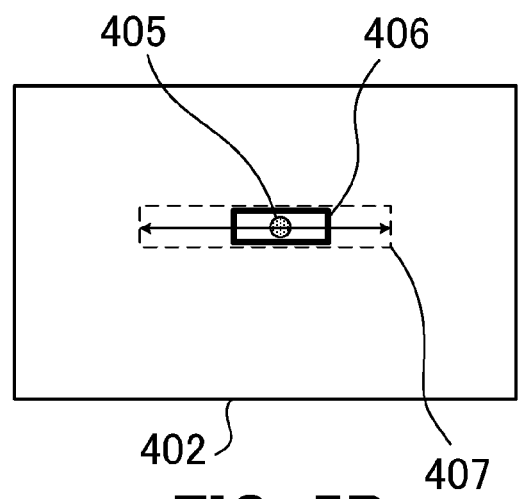

Next, referring to FIGS. 5A and 5B, the detection of the image shift amount (making the parallax map) in Step S308 of FIG. 4 will be described. FIGS. 5A and 5B are diagrams of describing the detection of the image shift amount (making the parallax map). The parallax map is data to obtain a parallax of each of the corresponding points based on a displacement (the image shift amount) of the corresponding points on the image pickup element 114 that is generated in accordance with a difference of light beams caused by the divided pupils between the A image (the left-sided image) and the B image (the right-sided image). Using the data, the defocus amount of the image pickup optical system, a distance of the object, and the like can be estimated. As a method of making the parallax map, a "stereo matching method" that calculates area correlation value of the left-sided and right-sided images (the A and B images) for each of partial images (an image of each block that is obtained by dividing an entire image into predetermined regions as blocks) or the like is generally used.

There are various kinds of methods as the stereo matching method, and in the present embodiment, a case where a simple template matching method using a difference and a sum is used to match a feature point will be described. FIGS. 5A and 5B illustrate the A image (the left-sided image) and the B image (the right-sided image), respectively. FIG. 5A illustrates each pixel point in the image, and FIG. 5B omits unnecessary pixel points for convenience of description. As illustrated in FIGS. 5A and 5B, a partial image of the A image (the left-sided image) which corresponds to a left-sided point of view position of the shooting image is referred to as a standard image 401 and a partial image of the B image (the right-sided image) which corresponds to a right-sided point of view position of the shooting image is referred to as a reference image 402 so as to perform the template matching. In the present embodiment, since the inside of the identical pixel unit cell 1 is divided into the left-sided and right-sided images (the A and B images), basically, there is only a one-dimensional shift in an x direction. Therefore, in the present embodiment, a one-dimensional correlation will be described, but the embodiment can also be applied to a two-dimensional shift.

First of all, a specific point in the standard image 401 is selected as an attention pixel (x, y) 404. Then, a region with a predetermined size around the attention pixel 404 is cut as a template 403. Next, considering roughly a moving amount of a point of view, a corresponding point searching region 407 in the reference image 402 is arbitrarily set. Then, a reference pixel 405 that exists inside the corresponding point searching region 407 is sequentially selected, and also the similarity of a window region 406 around the reference 405 having the same size as that of the template 403 with reference to the template 403 inside the standard image 401 is calculated. The calculation of the similarity of the attention pixel 404 is sequentially performed while the window region 406 moves in the corresponding point searching region 407.

The similarity in the vicinity of a candidate of the corresponding point can be calculated by the sum of squares of a difference of pixel values as represented by the following Expression (1).

$$JSDD = \sum_{i=-K}^{K} (I(x, y) - I0(xb + i, y))^2 \qquad (1)$$

In Expression (1), symbol (x,y) is a position of the attention pixel 404 for the left-sided image (the A image), and symbol I(x, y) is an image signal of the attention pixel 404 for the left-sided image (the A image). Symbol (xb+i,y) is a position of the reference pixel 405 for the right-sided image (the B image), and symbol I0(xb+i,y) is an image signal of the reference pixel 405 for the right-sided image (the B image). Symbol K is the corresponding point searching region 407. Symbol JSDD is called a "residual sum of squares", which indicates zero when the pixel values precisely match with each other. Accordingly, the reference pixel 405 at which the similarity JSDD corresponding to the attention pixel 404 is minimized is determined as a corresponding point (xmin,y). Then, a shift between the attention pixel (x,y) 404 used for the calculation of the similarity and the determined corresponding point (xmin,y) in a horizontal direction, i.e. the shift X=x−xmin, is obtained.

Using the template matching process as described above, corresponding information (matching information) of the B image (the right-sided image) with reference to the A image (the left-sided image) are obtained, and the difference X (=x−xmin) that is a shift (a displacement) between a coordinate of the attention pixel and a coordinate of the corresponding point in the horizontal direction is obtained as an image shift amount of the left-sided and right-sided images. This calculation is performed for each pixel unit cell and the image shift amount is arranged on a position of each pixel cell so as to make the parallax map. The present embodiment is not limited to the calculation of the image shift amount using the method described above, and another method may also be used if it is a method capable of calculating the image shift amount for each pixel in images including two points of view for which the matching process is to be performed.

Next, referring to FIGS. 6A and 6B through 10A to 10H, the calculation of a parameter related to the correction of the three-dimensional effect in the present embodiment will be described. The correction of the three-dimensional effect is performed to obtain an image which is multiplied by a coefficient depending on an aperture stop so that the image shift amount (the parallax) described with reference to FIGS. 5A and 5B is changed to be an image shift amount (a parallax) corresponding to a diameter of the aperture stop that is a reference.

Figures 6A, 6B:
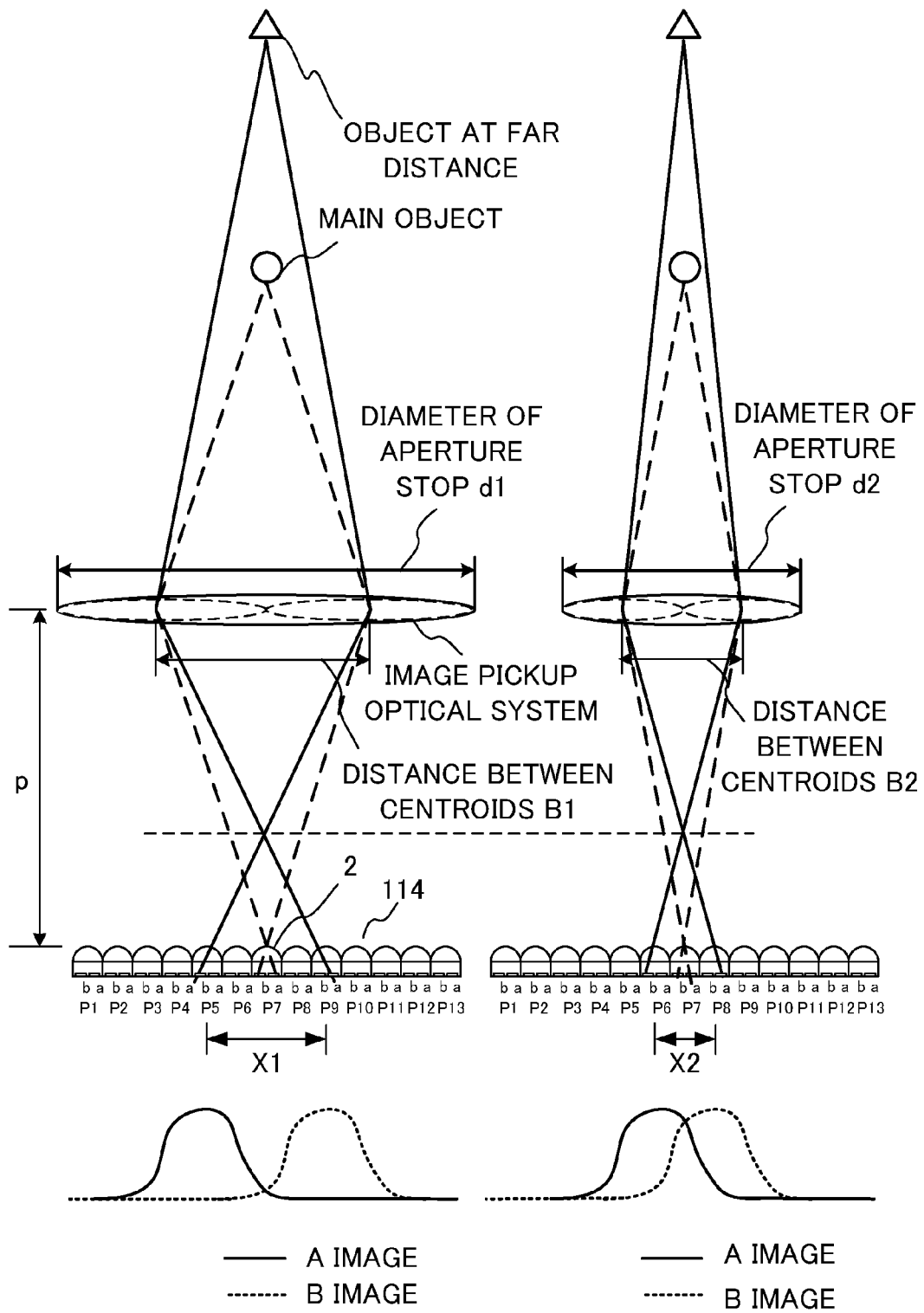
FIGS. 6A and 6B are diagrams of describing a shooting of a three-dimensional image (dependency on an aperture stop) of the image pickup element in Embodiment 1.

FIGS. 6A and 6B are diagrams of describing the shooting of the three-dimensional image (depending on the aperture stop) of the image pickup element 114, which illustrate a relationship between a focus position determined by the object and the image pickup optical system and an imaging state on the imaging plane. In FIGS. 6A and 6B, at a focal length p, states of focusing on a main object indicated by a circle are illustrated when the diameter of the aperture stop is d1 in FIG. 6A and is d2 in FIG. 6B. The light beam from the object for the pixels 1a and 1b is divided into a light beam passing through a divided pupil corresponding to an a-pixel in the image pickup optical system so as to enter the a-pixel and a light beam passing through a divided pupil corresponding to a b-pixel in the image pickup optical system so as to enter the b-pixel. Since these two light beams enter the pixels from an identical point on the object, they pass through an identical microlens 2 so as to reach one point on the image pickup element 114. Accordingly, the A image (the left-side image) and the B image (the right-sided image) substantially coincide with each other on the image pickup element 114. In FIGS. 6A and 6B, both the A image (the left-sided image) and the B image (the right-sided image) are formed on a pixel unit cell P7.

On the other hand, with respect to an indent light beam from an object at a far distance indicated by a triangle, as indicated by a solid line, an imaging point exists at a side of the image pickup optical system. Therefore, a state where the imaging plane exists behind the focus position, a so-called rear focus state, is obtained. In the rear focus state, positions that the light beams of the a-pixel and the b-pixel reaches are shifted from each other, and therefore the shift (the parallax) of the corresponding points is generated for the A image (the left-sided image) and the B image (the right-sided image). In FIG. 6A, the A image (the left-sided image) is formed on P9, and the B image (the right-sided image) is formed on P5. In FIG. 6B, the A image (the left-sided image) is formed on P8, and the B image (the right-sided image) is formed on P6.

FIG. 7 is a diagram of a relationship between the defocus amount and the image shift amount (the parallax) of the left-sided and right-sided images, which illustrates the relationship in the state of FIG. 6A. In FIG. 7, a lateral axis indicates the defocus amount, and a vertical axis indicates the image shift amount. As illustrated in FIG. 7, the defocus amount and the image shift amount of the left-sided and the right-sided images are proportional to each other. Since the defocus amount is proportional to an inverse of a distance, the distance can be calculated by obtaining the defocus amount. When the defocus amount is defined as D and the image shift amount of the left-sided and the right-sided images is defined as X, the following Expression (2) is satisfied.

$$D = K \times X + H \qquad (2)$$

In Expression (2), H is a hyperfocal offset, and K is a coefficient (an inclination coefficient). The coefficient K is calculated as represented by the following Expression (3), using a distance B (B1 in FIG. 6A and B2 in FIG. 6B) between centroids of the divided pupils of the left-sided and the right-sided images depending on the aperture stop 111 of the lens unit 101 and the focal length p between the lens 110 and the image pickup element 114.

$$K = B/p \qquad (3)$$

FIG. 8 is a diagram of a relationship between the defocus amount D and the image shift amount (the parallax) of the left-sided and the right-sided images in each of the states of FIGS. 6A and 6B based on the relation of FIG. 7. In the present embodiment, the diameter d1 of the aperture stop in FIG. 6A is set as a reference condition that is a target of correcting the three-dimensional effect, and the diameter d1 of the aperture stop is a maximum diameter of the aperture stop (an open state of the aperture stop) that is settable by the image pickup optical system (the lens unit 101) that is used at the time of shooting an image. The reason to set the aperture stop to the open state is that it is a condition that obtains a maximum image shift amount (a maximum parallax) settable by the mounted image pickup optical system (the lens unit 101). In the present embodiment, the image correcting portion 120 performs the correction so that the parallax is a parallax obtained in the open state (full-open state) of the aperture stop 111 or the parallax comes close to the parallax obtained in the open state.

As illustrated in FIG. 8, the state of the diameter d1 of the aperture stop in FIG. 6A has an inclination coefficient K1 and the diameter d2 of the aperture stop in FIG. 6B has an inclination coefficient K2. Thus, at the in-focus point indicated by the circle, independently of the diameter d1 or d2 of the aperture stop, the image shift amount (the parallax) of the left-sided and the right-sided images is not generated. On the other hand, in the rear focus state (indicated by the triangle) or a front focus state (indicated by a square), the image shift amount (the parallax) of the left-sided and the right-sided images is different depending on the diameter d1 or d2 of the aperture stop.

Specifically, the relation of image shift amounts X1 and X2 (parallaxes) of the left-sided and right-sided images in the rear focus state (indicated by the triangle) of FIGS. 6A and 6B is X1>X2. In this case, a coefficient Z of correcting the three-dimensional effect to adjust the inclination coefficient K2 to the inclination coefficient K1 is set to be the following Expression (4).

$$Z = X1/X2 = B1/B2 = K1/K2 \quad (4)$$

In other words, the coefficient Z of correcting the three-dimensional effect that is a correction magnification (a parallax magnification) of the image shift amount (the parallax) depending on the aperture stop 111 based on the inclination coefficient K1 in the diameter d1 as a reference and the inclination coefficient K2 in the diameter d2 of the aperture stop when actually shooting an image. Using the coefficient Z of correcting the three-dimensional effect (the parallax magnification), the image shift amount (the parallax) of the left-sided and right-sided images can be obtained independently of the diameter of the aperture stop.

FIG. 9 is a diagram of a relation between the diameter of the aperture stop (an F-number) and the inclination coefficient K, which illustrates a case where the focal length p is 50 mm. When an image shot by a diameter of the aperture stop of F5.6 is corrected to an image shift amount (a parallax) shot on condition that corresponds to F1.8, the correction may be performed using the coefficient Z of correcting the three-dimensional effect (Z=1.80/0.7=2.58). The inclination coefficient K can be obtained by previously storing data such as the diameter of the aperture stop, the focal length, and a light intensity distribution of the image pickup element and calculating it. Actually, however, since a vignetting caused by an aberration or a structure of the lens or the like is different in accordance with a type of the lens to be used, it is preferred that the data are previously stored for each lens (for each aperture stop). The present embodiment describes the case of the focal length p, but an actual lens has a structure that combines a plurality of lenses. Therefore, calculating the focal length p as an exit pupil distance, a higher accuracy result can be obtained.

The relation of the image shift amount X (the parallax) of the left-sided and right-side images measured in FIGS. 5A and 5B, the coefficient Z of correcting the three-dimensional effect described with reference to FIG. 6A, 6B to FIG. 9, and an image shift amount X' of the correction target (a target parallax) is represented as the following Expression (5).

$$X' = X \times Z \quad (5)$$

In other words, the three-dimensional effect is corrected by correcting the image shift amount (the parallax) of each pixel to be magnified by Z times in a horizontal direction so that the image shift amount X (the parallax) of the left-sided and right-sided images are the image shift amount X' (the parallax) of the correction target. As described above, in the present embodiment, the parameter of correcting the three-dimensional effect (the coefficient Z of correcting the three-dimensional effect) is obtained based on the aperture stop information of the lens unit 101 (the image pickup optical system).

FIGS. 10A to 10H are schematic diagrams of correcting the three-dimensional effect in the present embodiment. FIG. 10A is a top view of illustrating the relation of positions of objects for the image pickup apparatus. With reference to a main object (indicated by a circle), an object at a far distance (indicated by a triangle) exists, and the image pickup optical system is controlled so as to focus on the main object. FIG. 10B illustrates a case where the objects are viewed from the image pickup apparatus, and the image is recorded as illustrated in the drawing when the 2D shooting (the two-dimensional shooting) is performed.

FIGS. 10C to 10E are diagrams of schematically illustrating the A image (the left-sided image) and the B image (the right-sided image) of the image pickup element on condition that each of the objects is on an identical line. FIG. 10C illustrates a state before correcting the three-dimensional effect for the diameter d1 of the aperture stop that is a reference (a large diameter of the aperture stop), FIG. 10D illustrates a state before correcting the three-dimensional effect for the diameter d2 of the aperture stop (a small diameter of the aperture stop), and FIG. 10E illustrates a state after correcting the three-dimensional effect for the diameter d2 of the aperture stop (the small diameter of the aperture stop). FIG. 10C does not indicate an image shift of the main object (indicated by circles) and indicates an image shift amount X1 of the left-sided and right-sided images of the object at a far distance (indicated by triangles). On the other hand, FIG. 10D does not indicate the image shift of the main object (indicated by circles) and indicates an image shift amount X2 of the left-sided and right-sided images of the object at the far distance (indicated by triangles) which is smaller than the image shift amount X1. In this case, there is a possibility that the object at the far distance (indicated by triangles) in FIG. 10C is a blurred image compared to the object at the far distance (indicated by triangles) in FIG. 10D. FIG. 10E illustrates a state which is obtained by performing the correction of the three-dimensional effect for FIG. 10D. FIG. 10E is a state where the image shift amount X of the left-sided and right-sided images is multiplied by the coefficient Z of correcting the three-dimensional effect depending on the diameter of the aperture stop for the corresponding object of each of the A image (the left-sided image) and the B image (the right-sided image), using the method of illustrating in FIGS. 5A and 5B to 9.

FIGS. 10F to 10H are schematic diagrams (top views) of illustrating the three-dimensional effect that is visible by an observer when the shot image for which the correction of the three-dimensional effect has been performed is displayed as illustrated in FIGS. 10C to 10E. In FIG. 10F, there is no image shift of the main object, and therefore the main object appears to exist on a surface of the display unit that is a reference plane. On the other hand, with respect to the object at the far distance, an intersection point (a cross point) existing on an extended line of the points of view of the left and right eyes that are caused by the image shift amount (the parallax) of the left-sided and right-sided images, depending on the diameter d1 of the aperture stop, is generated at the rear side compared to the surface of the display unit, and therefore a deep three-dimensional effect is obtained. In FIG. 10G, with respect to the object at the far distance, the cross point depending on the diameter d2 of the aperture stop is generated at the rear side compared to the surface of the display unit, but the cross point exists at a position near the surface of the display unit compared to FIG. 10F. Therefore, the three-dimensional effect of FIG. 10G is lower than that of FIG. 10F.

On the other hand, in FIG. 10H, the correction of the three-dimensional effect is performed for the image on the surface of the display unit. Therefore, the cross point of the object at the far distance is substantially the same as that at the time of shooting an image on condition of the diameter d1 of the aperture stop that is a reference. Accordingly, even when the shooting is performed in the diameter d2 of the aperture stop, a three-dimensional effect similar to that in the larger diameter d1 of the aperture stop can be obtained. Since a depth of field in the small diameter d2 of the aperture stop is deeper than that in the reference diameter d1 of the aperture stop, a more focused depth effect (a more focused three-dimensional effect) can be obtained. The embodiment describes the object at the far distance, and additionally, the similar correction is also performed for an object at a near distance to be able to obtain an embossed effect (three-dimensional effect) similar to the three-dimensional effect generated in a desired diameter of the aperture stop.

Figure 11A:
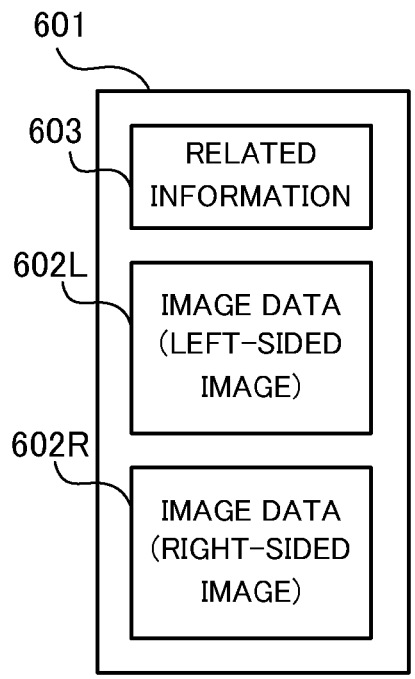
FIGS. 11A and 11B are schematic diagrams of three-dimensional image data in Embodiment 1.
Figure 11B:
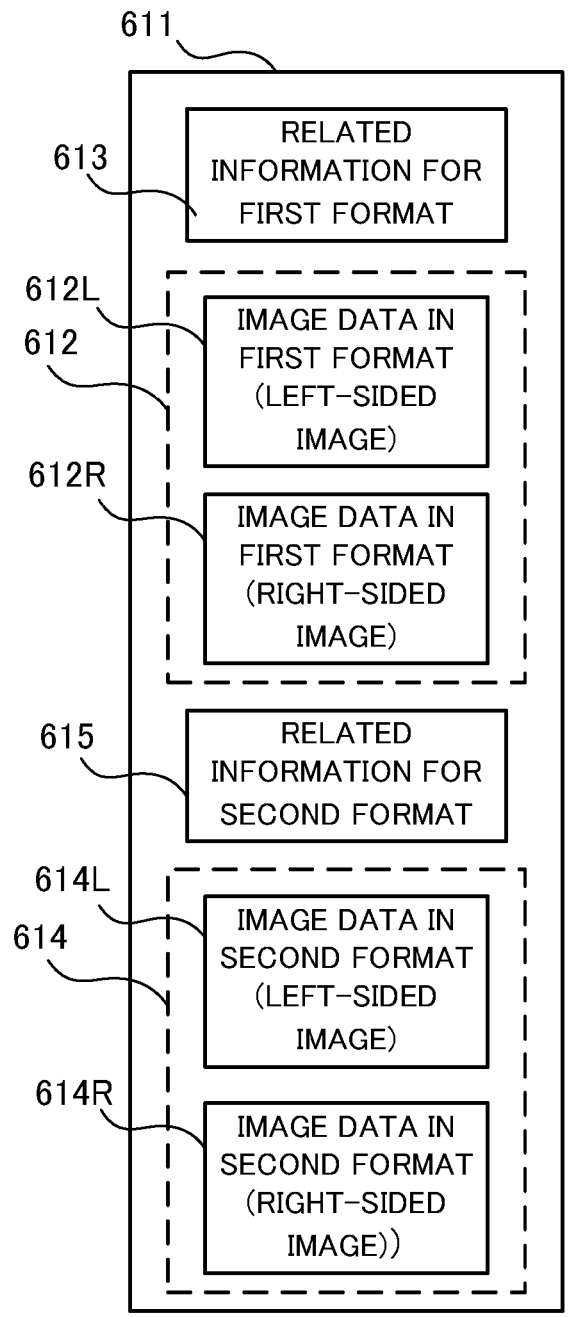

FIGS. 11A and 11B are schematic diagrams of three-dimensional image data containing the image data and the related information described with reference to Steps S311 and S312 in FIG. 4. In FIG. 11A, reference numeral 601 denotes three-dimensional image data that are obtained as a pair of three-dimensional images. Left-sided image data 602L and right-sided image data 602R in which the image shift amount has been corrected are stored in the three-dimensional image data. Reference numeral 603 denotes related information of the three-dimensional image data 601. The related information 603 includes information to correct the three-dimensional effect determined based on the image shift amount described above (for example, the diameter d of the aperture stop, or the coefficient Z of correcting the three-dimensional effect). The related information 603 may also include other information related to shooting an image such as a shutter speed, a frame rate, or shooting lens information (a focal length, an exit pupil distance, an F-number, or an open F-number). In the embodiment, the related information 603 are indicated as one region including the left-sided image data 602L and the right-sided image data 602R, and alternatively the related information 603 may be stored separately in different regions of a left-sided image dedicated region and a right-sided image dedicated region.

FIG. 11B illustrates a case where an image file in a plurality of formats are related to each other. In FIG. 11B, reference numeral 611 denotes data (three-dimensional image data) of images (left-sided and right-sided images) that are shot as a pair of three-dimensional images. Reference numerals 612 and 614 are image data in which data of the shot images (the left-sided and right-sided images) are stored in formats different from each other. For example, reference numeral 612 denotes image data stored in a JPEG format as a first format, and reference numeral 614 denotes image data stored in a RAW format as a second format, and thus the image data 612 and 614 are image data stored in formats different from each other. Each of the image data 612 and 614 includes the left-sided image data 612L and 614L and the right-sided image data 612R and 614R. An image size of the image data stored in each format does not need to be the same, and for example the image data 612 may be image data of a recording pixel region where the image shift amount has been corrected, and the image data 614 may be image data of an effective pixel region where the image shift amount has not been corrected.

Reference numeral 613 denotes related information of the three-dimensional image data 611 that are stored in the first format, and reference numeral 615 denotes related information of the three-dimensional image data 611 that are stored in the second format. The related information 613 and 615 include information for correcting the three-dimensional effect determined based on the image shift amount information described above (for example, the coefficient Z of correcting the three-dimensional effect). Similarly to the related information 603 in FIG. 11A, other information related to shooting the image such as the shutter speed, the frame rate, or the shooting lens information (the diameter of the aperture stop, i.e. the F-number, the focal length, the exit pupil distance, or the open F-number) may be included. When information in different formats of an identical image are stored, the related information for each format do not need to be identical. For example, also with respect to the information to correct the three dimensional effect, the coefficient Z of correcting the three-dimensional effect may be only stored for the first format, and both the diameter of the aperture stop (the F-number) and the coefficient Z of correcting the three-dimensional effect may be stored for the second format.

In FIGS. 11A and 11B, the image shift amount (the parallax) of the left-sided and right-sided images is corrected in the image data (the left-sided and right-sided images) shot as the pair of three-dimensional images, but the present embodiment is not limited to this. For example, at the time of recording the image, the information related to the correction of the three-dimensional effect such as the shooting lens information (the focal length, the exit pupil distance, the F-number, the open F-number, or the like) or the coefficient Z of correcting the three-dimensional effect are given to the three-dimensional data, and thus a desired image shift amount (parallax) of the information at the time of shooting the image can also be corrected at the side of the display unit. Therefore, the image shift amount of the left-sided and right-sided images does not need to be corrected for the image data (the left-sided and right-sided images) that are to be stored. In other words, there may be a case where the corrected image is not made in the operation of correcting the three-dimensional effect in Step S310 of FIG. 4.

In the present embodiment, the diameter d1 of the aperture stop that is a reference of the three-dimensional effect (the correction target) is described as the open aperture stop in the image pickup optical system that is used to shoot an image, but the present embodiment is not limited to this. The image pickup apparatus 100, for example, may have a mode in which a desired F-number can be set as a reference. The diameter d1 of the aperture stop may also be corrected by using theoretical values of the focal length and the diameter of the aperture stop, or a predetermined diameter of an aperture stop in another lens as a reference, regardless of the lens that is used to shoot the image. According to this method, an image shift amount (a parallax) more than that in the open aperture stop of the image pickup optical system can also be generated.

As described above, according to the present embodiment, in an image pickup apparatus using the divided pixels so as to perform the ranging operation and obtain the three-dimensional image, an image shift by an image shift amount corresponding to an object at a predetermined distance can be performed. Therefore, a pseudo image shift (an artificial image shift) is given to the image object (the in-focus position), and thus the three-dimensional effect can be given to the main object.

Embodiment 2

Next, an image pickup apparatus in Embodiment 2 of the present invention will be described. In Embodiment 1, the single-shot operation is mainly described. In this regard, when a continuous shooting operation (a continuous shooting, a moving image, or the like) is performed, considering occurrence of a feeling of strangeness for the change of the three-dimensional effect from a first frame, it is preferred that the diameter of the aperture stop for the first frame is set to the reference diameter d1 of the aperture stop (the target of correcting the three-dimensional effect) so as to correct the three-dimensional effect for a second frame and its subsequent frames.

Figure 12:
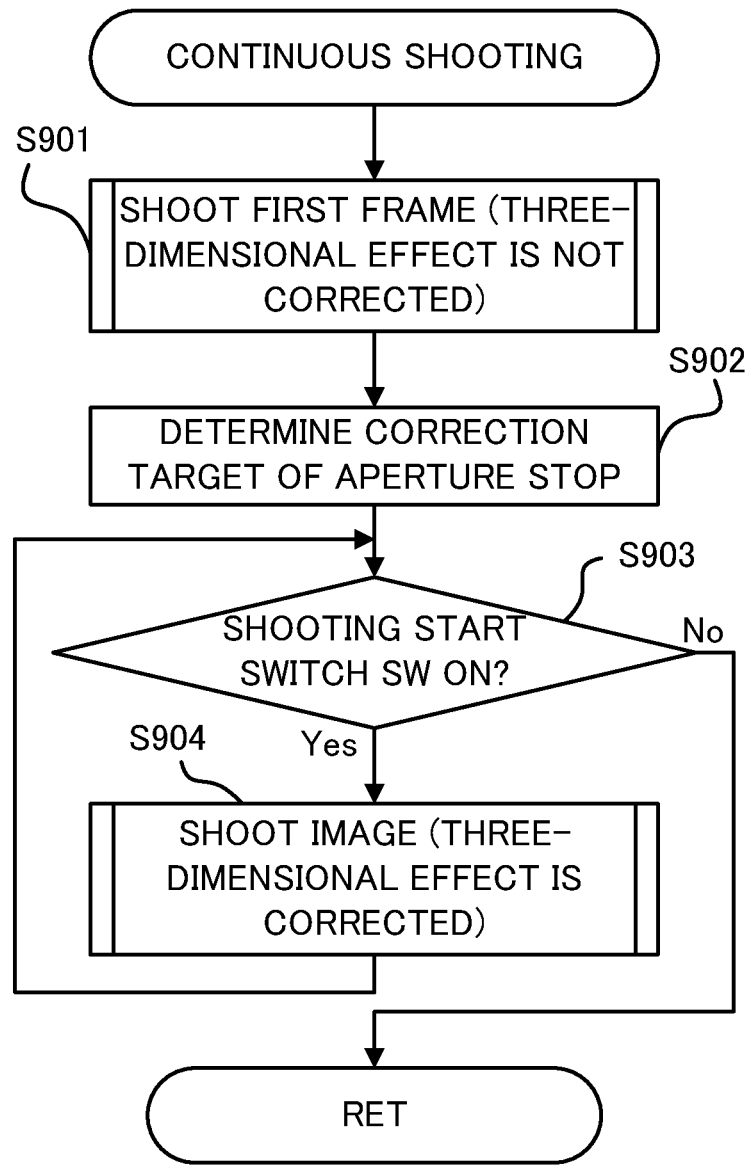
FIG. 12 is a flowchart of illustrating a shooting operation of an image pickup apparatus in Embodiment 2.

Referring to FIG. 12, a sequence of setting the diameter of the aperture stop at the time of shooting the first frame (at the time of starting the shooting) as a reference of correcting the three-dimensional effect will be described. FIG. 12 is a flowchart of illustrating the shooting operation of an image pickup apparatus in the present embodiment, which illustrates a simple shooting sequence at the time of the continuous shooting operation. The flow of FIG. 12 starts when the shooting start switch SW is turned on in a state where the continuous shooting operation such as the continuous shooting or the moving image is set by a continuous shooting mode setting switch (not shown) of the image pickup apparatus. Each step of FIG. 12 is performed based on an instruction of the system control circuit 150.

First of all, in Step S901, a first frame is shot. The shooting operation is the same as the shooting sequence described with reference to FIG. 4. However, since it is not necessary to correct the three-dimensional effect in Step S901, Step S309 of FIG. 4 is not performed in the present embodiment. Subsequently, in Step S902, the diameter of the aperture stop used in Step S901 is stored as the reference diameter d1 of the aperture stop that is a correction target. Then, in Step S903, the system control circuit 150 determines whether the shooting start switch SW maintains the on-state or is turned off. When the shooting start switch SW is set to on, the flow proceeds to Step S904. On the other hand, when the shooting start switch SW is set to off, this sequence is finished and the image pickup apparatus returns to a standby state.

In Step S904, the system control circuit 150, similarly to the case of the first frame, performs the shooting sequence described with reference to FIG. 4. In this case, as the reference diameter d1 of correcting the three-dimensional effect, the diameter of the apertures stop stored in Step S902 (the diameter of the aperture stop for the first frame) is used. When the shooting operation is finished, the flow returns to Step S903. The first frame may also be used as a preliminary shooting before an actual shooting.

According to the present embodiment, the diameter of the aperture stop initially set at the time of the continuous shooting operation is set as a reference of the three-dimensional effect, and the correction of the three-dimensional effect is performed by using the diameter of the aperture stop. In other words, the image correcting portion 120 performs the correction so that the parallax becomes the parallax obtained when starting the shooting or the parallax comes close to the parallax obtained when starting the shooting. Therefore, the feeling of strangeness for the change of the three-dimensional effect can be reduced.

As the sequences illustrated in FIGS. 4 and 12, the diameter d1 of the aperture stop as a reference (a correction target) may also be set so as not to be changed in the continuous shooting (a continuous shooting, a moving image, or the like). In this case, in the continuous shooting, the image correcting portion 120 performs the correction using a parameter set at the initial time of the shooting until the continuous shooting is finished. According to this configuration, a stable three-dimensional effect can be obtained even when the diameter of the aperture stop is changed while the continuous shooting is performed.

Embodiment 3

Next, an image pickup apparatus in Embodiment 3 of the present invention will be described. In Embodiment 1, the coefficient (the correction coefficient) that is previously stored or that is calculated is used. However, in view of the efficiency of the memory, it is not preferable that the plurality of data including data related to the interchangeable lens are previously stored. In addition, when a lens which is different in a type from the lens stored in the memory is mounted on the image pickup apparatus body, there is a possibility that an unexpected problem occurs.

The present embodiment obtains the image shift amounts (the parallaxes) X1 and X2 of the left-sided and right-sided images for an object at a predetermined distance so as to calculate the coefficient Z of correcting the three-dimensional effect during the operation of the preliminary shooting before the actual shooting, and thus a value of correcting the three-dimensional effect in which it is not necessary to previously store individual lens data is calculated. Specifically, the image pickup apparatus 100 of the present embodiment has an operation mode of obtaining the parameter (the coefficient Z of correcting the three-dimensional effect or the like) used for the correction by the image correcting portion 120 before the actual shooting.

Figure 13:
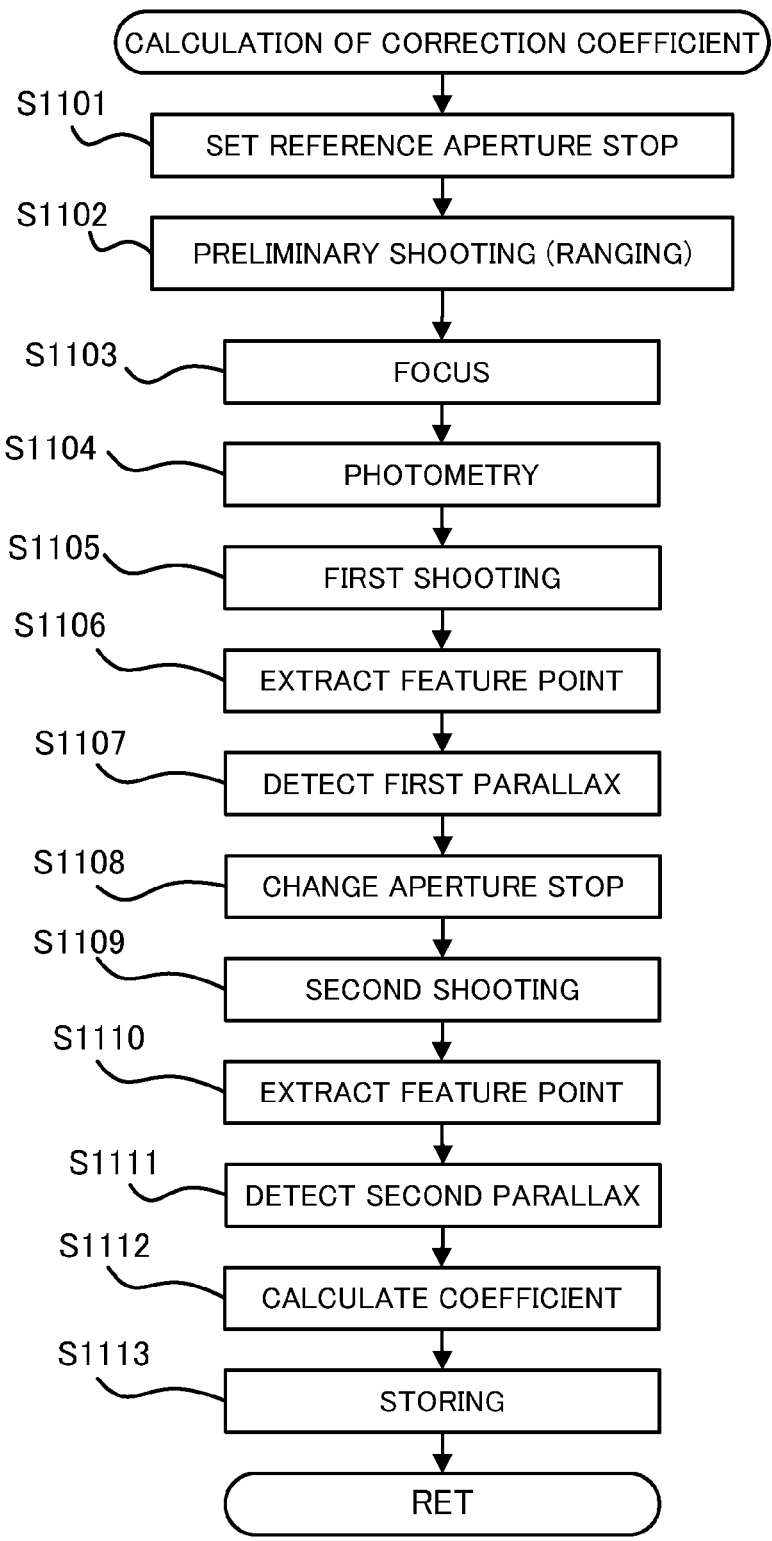
FIG. 13 is a flowchart of illustrating a shooting operation of an image pickup apparatus in Embodiment 3.

FIG. 13 is a flowchart of illustrating the shooting operation of the image pickup apparatus in the present embodiment, which illustrates a method of calculating the correction coefficient. This flow may be an operation of obtaining the correction value performed by a switch (not shown) before the actual shooting, or may be operated as a part of the operation of the preliminary shooting of Step S301 in FIG. 4. Each step of FIG. 13 is performed based on an instruction of the system control circuit 150.

First of all, in Step S1101, the aperture stop 111 in the lens unit 101 is set to the reference diameter d1 (F-number) of the aperture stop (setting a reference aperture stop). In order to obtain a strong three-dimensional effect, it is preferred that the aperture stop is set to the open aperture stop of the mounted lens, but the present embodiment is not limited to this. For example, the reference diameter 1 of the aperture stop may also be set to a predetermined diameter of the aperture stop desired by a user. Subsequently, in Step S1102, a preliminary shooting operation is performed for a ranging and a photometry.

Next, in Step S1103, the system control circuit 150 obtains an in-focus position based on the defocus amount calculated in Step S1102. Then, the lens controller 113 performs a focus operation that drives the lens 110 toward an in-focus target. Subsequently, in Step S1104, a photometric operation is performed to obtain exposure information of an object based on the information obtained in Step S1102. Then, in Step S1105, according to a shooting condition set in Steps S1101 to S1104, a shutter control and an accumulation and a readout operation of the image pickup element 114 (a first shooting) are performed.

Next, in Step S1106, the parallax detector 123 makes the parallax map between the left-sided image (the A image) and the right-sided image (the B image), and extracts (determines) a feature point in this time. The parallax map is read from the image pickup element 114 in Step S1105, which is made based on an image temporarily stored in the memory 118 via the output signal processing circuit 116. As a method of determining the feature point, for example, there is a method of recognizing a region where a predetermined image shift amount is generated between the left-sided and right-sided images as a feature point based on a shape, a color, an output value, or the like. Alternatively, a distance from a main object (a region where there is no image shift amount of the left-sided and right-sided images) or the like may be used to set the feature point. However, since the region is set to detect the image shift amount, the region which is not at the in-focus position is set as the feature point.

Next, in Step S1107, the parallax detector 123 detects a shift (a displacement) between the left-sided and right-sided images at the feature point extracted in Step S1106 as an image shift amount X1 (a first parallax). As a method of detecting the parallax, for example, the method described with reference to FIGS. 5A and 5B is used.

Subsequently, in Step S1108, the diameter d1 of the aperture stop set in Step S1101 is changed to the diameter d2 of the aperture stop (the F-number) different from the diameter d1 of the aperture stop. The diameter d2 of the aperture stop set in Step S1108 is a diameter of the aperture stop (an F-number) which is used at the time of shooting an image. Then, in Step S1109, according to the shooting condition set in Steps S1101 to S1104, a shutter control and an accumulation and a readout operation of the image pickup element 114 (a second shooting) are performed. In this case, since the diameter d1 of the aperture stop is changed to the diameter d2 of the aperture stop, the settings of the shutter control and the accumulation time are changed to be an appropriate exposure.

Next, in Step S1110, the parallax detector 123 makes the parallax map between the left-sided image (the A image) and the right-sided image (the B image), and extracts (determines) a feature point in this time. The parallax map is read from the image pickup element 114 in Step S1109, which is made based on an image temporarily stored in the memory 118 via the output signal processing circuit 116. Subsequently, in Step S1111, the parallax detector 123, similarly to the case of Step S1107, detects a shift between the left-sided and right-sided images at the feature point extracted in Step S1110 as an image shift amount X2 (a second parallax).

Next, in Step S1112, the system control circuit 150 compares the image shift amount X1 (the first parallax) detected in Step S1107 with the image shift amount X2 (the second parallax) detected in Step S1111 so as to calculate the coefficient Z of correcting the three-dimensional effect. Then, in Step S1113, the coefficient Z of correcting the three-dimensional effect calculated in Step S1112 is stored in the correction parameter setting portion 115 or the like, and then this flow is finished. The flow of FIG. 13 only compares the two diameters of the aperture stop so as to obtain the coefficient of correcting the three-dimensional effect, but the present embodiment is not limited to this. The present embodiment may also change the diameter of the aperture stop to repeat the flow of FIG. 13 more than once so as to obtain correction coefficients of a plurality of diameters of the aperture stop.

According to the present embodiment, the data is obtained while the diameter of the aperture stop in the mounted lens changes so as to calculate the coefficient of correcting the three-dimensional effect, and thus a storage region of the data can be reduced and an efficient operation of correcting the three-dimensional effect can be performed.

According to each of the embodiments described above, when a three-dimensional image is generated by an image pickup element having a pixel unit cell configured by arranging a plurality of pixels for one microlens, an image pickup apparatus, an image pickup system, and a method of controlling the image pickup apparatus that reduce dependency of an aperture stop for a three-dimensional effect can be provided. Furthermore, a program that describes a procedure of the method of controlling the image pickup apparatus and that is executable by a computer can be provided. In addition, a non-transitory computer-readable storage medium that stores the program that causes the computer to execute the method of controlling the image pickup apparatus can be provide.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176657, filed on Aug. 9, 2012, which is hereby incorporated by reference herein in its entirety.

What is claimed is:

1. An image pickup apparatus that generates a three-dimensional image, comprising:
    an image pickup element comprising a microlens and a pixel unit cell comprising a plurality of pixels configured to receive light from the microlens, the image pickup element being configured to output a separated first image signal and second image signal for respective pixels of the pixel unit cell;
    a parallax detector configured to calculate a parallax comprising an image shift amount between the first image signal and the second image signal;
    a change detector configured to detect a change of an aperture stop; and
    an image correcting portion configured to perform a correction to reduce an amount of change of the parallax which depends on the change in the aperture stop.

2. The image pickup apparatus according to claim 1, wherein the image correcting portion is configured to perform the correction using a parallax magnification depending on the aperture stop.

3. The image pickup apparatus according to claim 1, wherein the image correcting portion is configured to perform the correction so that the parallax comes close to a parallax obtained when the aperture stop is in an open state.

4. The image pickup apparatus according to claim 1, wherein the image correcting portion is configured to perform the correction so that the parallax comes close to a parallax obtained when a shooting operation starts.

5. The image pickup apparatus according to claim 1, wherein the image pickup apparatus has a mode of obtaining a parameter used for the correction performed by the image correcting portion before an actual shooting.

6. The image pickup apparatus according to claim 1, wherein when a continuous shooting is performed, the image correcting portion is configured to perform the correction using a parameter set at an initial time of shooting an image until the continuous shooting is finished.

7. An image pickup system that generates a three-dimensional image, comprising:
- an image pickup element comprising a microlens and a pixel unit cell comprising a plurality of pixels arranged to receive light from the microlens, the image pickup element configured to output a separate first image signal and second image signal for respective pixels of the pixel unit cell;
- a parallax detector configured to calculate a parallax comprising an image shift amount between the first image signal and the second image signal;
- a change detector configured to detect a change of an aperture stop;
- an image correcting portion configured to perform a correction to reduce an amount of change of the parallax which depends on the change of the aperture stop; and
- an image pickup optical system configured to form an optical image on the image pickup element.

8. A method of controlling an image pickup apparatus that generates a three-dimensional image, the method comprising the steps of:
- outputting a separate first image signal and second image signal for respective pixels of a pixel unit cell of an image pickup apparatus;
- calculating a parallax comprising an image shift amount between the first image signal and the second image signal;
- detecting a change of an aperture stop; and
- performing a correction to reduce an amount of change of the parallax which depends on the change of the aperture stop.

9. A non-transitory computer-readable storage medium that stores a program that upon execution causes a computer to perform a method of controlling an image pickup apparatus that generates a three-dimensional image comprising:
- outputting a separate first image signal and second image signal for respective pixels of a pixel unit cell of an image pickup apparatus;
- calculating a parallax comprising an image shift amount between the first image signal and the second image signal;
- detecting a change of an aperture stop; and
- performing a correction to reduce an amount of change of the parallax which depends on the change of the aperture stop.

* * * * *